United States Patent
Acharya et al.

(10) Patent No.: US 9,300,633 B2
(45) Date of Patent: Mar. 29, 2016

(54) NETWORK-LEVEL ACCESS CONTROL MANAGEMENT FOR THE CLOUD

(71) Applicant: International Business Machines Corporation, Armonk, NY (US)

(72) Inventors: Arup Acharya, Nanuet, NY (US); Kirk Alan Beaty, Goldens Bridge, NY (US); Ashish Kundu, Elmsford, NY (US); Vijay K. Naik, Pleasantville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/223,327

(22) Filed: Mar. 24, 2014

(65) Prior Publication Data
US 2014/0289791 A1 Sep. 25, 2014

Related U.S. Application Data

(60) Provisional application No. 61/804,833, filed on Mar. 25, 2013.

(51) Int. Cl.
*H04L 29/06* (2006.01)
*H04L 29/12* (2006.01)

(52) U.S. Cl.
CPC ........ *H04L 63/0236* (2013.01); *H04L 61/2575* (2013.01); *H04L 29/12386* (2013.01); *H04L 61/2514* (2013.01); *H04L 61/2521* (2013.01); *H04L 61/2564* (2013.01)

(58) Field of Classification Search
CPC ............ H04L 63/0236; H04L 61/2575; H04L 61/2564; H04L 61/2514; H04L 29/12386; H04L 61/2521
See application file for complete search history.

(56) References Cited

U.S. PATENT DOCUMENTS

| | | | |
|---|---|---|---|
| 2012/0222084 A1 | 8/2012 | Beaty | |
| 2014/0244851 A1* | 8/2014 | Lee | 709/228 |
| 2014/0280961 A1* | 9/2014 | Martinez et al. | 709/226 |

OTHER PUBLICATIONS

Amazon Elastic Compute Cloud User Guide (formerly http://docs.amazonwebservices.com/awsec2/latest/userguide/usingnetwork-security.html), downloaded Nov. 5, 2015 from https://web.archive.org/web/20120703030846/http://docs.amazonwebservices.com/AWSEC2/latest/UserGuide/using-network-security.html?, Jul. 3, 2012, pp. 1-9.
Peter Mell and Tim Grance, The NIST Definition of Cloud Computing, Version 15, Oct. 7, 2009, pp. 1-2.

(Continued)

*Primary Examiner* — Krisna Lim
(74) *Attorney, Agent, or Firm* — Louis J. Percello; Otterstedt, Ellenbogen & Kammer, LLP

(57) ABSTRACT

A cloud access manager obtains input regarding access control for at least one application deployed on a plurality of virtual machine instances in a cloud computing environment; the virtual machine instances are divided into at least first and second access zones. A cloud access manager registrar located in the cloud computing environment registers internet protocol addresses of external clients as seen from the cloud computing environment; at least some of the addresses are assigned to the clients via network address translation (NAT). Session traversal utility for NAT (STUN) is carried out to determine public internet protocol addresses assigned to the clients via NAT. The cloud access manager controls (i) access of the external clients to the plurality of virtual machine instances; and (ii) access of the plurality of virtual machine instances to each other, based on the registered internet protocol addresses, in accordance with the access zones.

20 Claims, 12 Drawing Sheets

(56) References Cited

OTHER PUBLICATIONS

IBM SmartCloud Enterprise Release 2.0. Customizing images and software bundles, IBM, 2011, pp. i-vi and 1-70.
Theophilus Benson, Aditya Akella, Anees Shaikh, and Sambit Sahu. Cloudnaas: a cloud networking platform for enterprise applications. In SOCC '11, pp. 8:1-8:13, New York, NY, USA, 2011. ACM.
Yanpei Chen, Vern Paxson, and Randy H. Katz. Whats new about cloud computing security? Technical Report UCB/EECS-2010-5, EECS Department, University of California, Berkeley, Jan. 20, 2010, pp. 1-8.
Mihai Christodorescu, Reiner Sailer, Douglas Lee Schales, Daniele Sgandurra, and Diego Zamboni. Cloud security is not (just) virtualization security: a short paper. In CCSW '09, pp. 97-102, New York, NY, USA, 2009. ACM.
Bernd Grobauer, Tobias Walloschek, and Elmar Stocker. Understanding cloud computing vulnerabilities. IEEE Security and Privacy, 9(2) pp. 50-57, Mar./Apr. 2011.
J Rosenberg, R Mahy, P Matthews, D Wing . RFC 5389—Session Traversal Utilities for (NAT) (STUN), downloaded from http://tools.ietf.org/html/rFc5389 on Mar. 21, 2014, pp. 1-52 (Oct. 2008).
Kamailio SIP Server, Welcome to Kamailio™—the Open Source Sip Server. downloaded from http://www.kamailio.org/w/ on Mar. 21, 2014, 2008-2013 Kamailio SIP Server Project, pp. 1-2.
Wikipedia, the free encyclopedia, Virtual Private Networks, downloaded from http://en.wikipedia.org/wiki/Virtual_private_network on Mar. 22, 2014, pp. 1-5.
IBM Point of View: Security and Cloud Computing. Cloud computing IBM White paper, Nov. 2009, pp. 1-20.
OpenSips: the new breed of communication engine, downloaded from http://www.opensips.org/ on Mar. 21, 2014, p. 1.
J. Rosenberg et al, SIP: Session Initiation Protocol, RFC 3261, AT&T Jun. 2002, downloaded from http://www.ietf.org/rfc/r1c3261.txt on Mar. 21, 2014, pp. 1-252.
IBM PureSystems. downloaded from http://www.ibm.com/ibm/puresystems/us/en/index.html on Mar. 21, 2014, pp. 1-2.
B. Lowekamp D. MacDonald. Internet Engineering Task Force (IETF)—NAT Behavior Discovery Using Session Traversal Utilities for NAT (STUN) RFC 5780 May 2010 Skype donloaded from http://www.hjp.at/doc/rfc/rfc5780.html. Nov. 5, 2015 pp. 1-55.
Amazon Elastic Compute Cloud (EC2) originally from http://aws.amazon.com/ec2, Sep. 2, 2012, downloaded Nov. 5, 2015 from https://web.archive.org/web/20120902010621/http://aws.amazon.com/ec2/, pp. 1-15.
IBM Service Management Extensions for Hybrid Cloud, Feb 5,2013, downloaded Nov. 5, 2015 from https://www-304.ibm.com/software/brandcatalog/ismlibrary/details?catalog.label=1TW10TS0D, pp. 1-3.
Masoud Moshref, Minlan Yu, Abhishek Sharma, and Ramesh Govindan. vcrib: virtualized rule management in the cloud. In HotCloud'12, pp. 23-23, Berkeley, CA, USA, 2012. USENIX Association.
Lucian Popa, Minlan Yu, Steven Y. Ko, Sylvia Ratnasamy, and Ion Stoica. Cloudpolice: taking access control out of the network. In Hotnets-IX, pp. 7:1-7:6, New York, NY, USA, 2010. ACM.
Alan Shieh, Srikanth Kandula, Albert Greenberg, Changhoon Kim, and Bikas Saha. Sharing the data center network. In NSDI'11, pp. 23-23, Berkeley, CA, USA, 2011. USENIX Association.
IBM SmartCloud Enterprise (SCE). originally at http://www-935.ibm.com/services/us/en/cloud-enterprise/index.html, Oct. 1, 2012, downloaded Nov. 5, 2015 from https://web.archive.org/web/20121001002820/http://www-935.ibm.com/services/us/en/cloud-enterprise/index.html, pp. 1-2.

* cited by examiner

NETWORK-LEVEL ACCESS CONTROL MANAGEMENT FOR THE CLOUD

CROSS-REFERENCE TO RELATED APPLICATIONS

This application claims the benefit of U.S. Provisional Application Ser. No. 61/804,833 filed Mar. 25, 2013, the complete disclosure of which is expressly incorporated herein by reference in its entirety for all purposes.

STATEMENT OF GOVERNMENT RIGHTS

Not Applicable.

STATEMENT REGARDING PRIOR DISCLOSURES BY THE INVENTOR OR A JOINT INVENTOR

Not Applicable.

FIELD OF THE INVENTION

The present invention relates to the electrical, electronic and computer arts, and, more particularly, to cloud computing and the like.

BACKGROUND OF THE INVENTION

One pertinent security issue that public cloud computing platforms face today is that the active cloud virtual machine instances are visible and accessible via the public internet, which potentially allows hackers to carry out several types of attacks. Examples of such attacks include Denial of Service (DoS) and intrusion over long durations, which increase the probability of successful penetration. Most systems running on public cloud instances today are not security-hardened to withstand such persistent and long attacks. Attacks may potentially be harmful to the enterprise that uses such instances to deliver cloud services, for the users that use such services, and for the cloud provider that provides the cloud infrastructure.

SUMMARY OF THE INVENTION

Principles of the invention provide techniques for network-level access control management for the cloud. In one aspect, an exemplary method for managing control of access of servers by clients behind network address translation (NAT) includes the steps of obtaining, at a cloud access manager executing on at least one hardware processor, input regarding access control for at least one application deployed on a plurality of virtual machine instances in a cloud computing environment; with the cloud access manager executing on the at least one hardware processor, dividing the plurality of virtual machine instances into at least first and second access zones in accordance with the input; and registering, with a cloud access manager registrar located in the cloud computing environment, internet protocol addresses of external clients as seen from the cloud computing environment. At least some of the registered internet protocol addresses comprising public internet protocol addresses assigned to the clients via network address translation. Further steps include carrying out session traversal utility for network address translation to determine the public internet protocol addresses assigned to the clients via the network address translation; and, with the cloud access manager executing on the at least one hardware processor, controlling, based on the registered internet protocol addresses: (i) access of the external clients to the plurality of virtual machine instances; and (ii) access of the plurality of virtual machine instances to each other, in accordance with the access zones, such that:

those of the virtual machine instances in a same given one of the access zones have access to each other;

the external clients are permitted a first level of access to those of the virtual machine instances in the first access zone, according to a first policy; and the external clients are permitted a second level of access, different than the first level of access, to those of the virtual machine instances in the second access zone, according to a second policy.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide one or more of the following advantages:

Clients behind NATs can be registered for accessing services on networks based on their NAT-ed IP addresses. In previous technologies, clients behind NATs cannot be registered for services without giving them a constant NAT-ed address.

Clients behind NATs can collectively use a gateway in order to access a service. That way, the access rules for servers are minimized.

Clients behind NATs can be registered to access servers within one or more protection zones.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Cloud Computing Aspects

Figure 1:
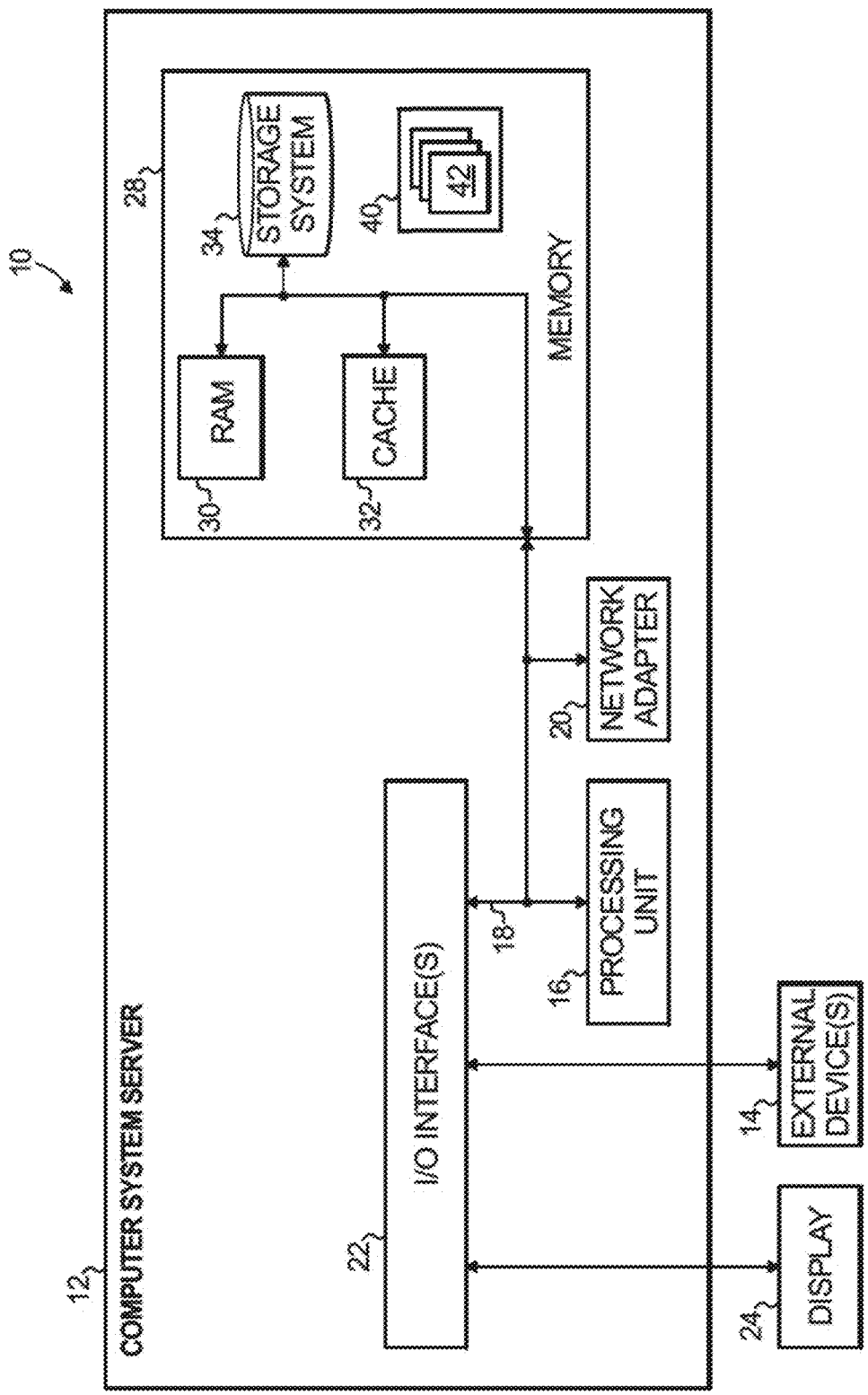
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
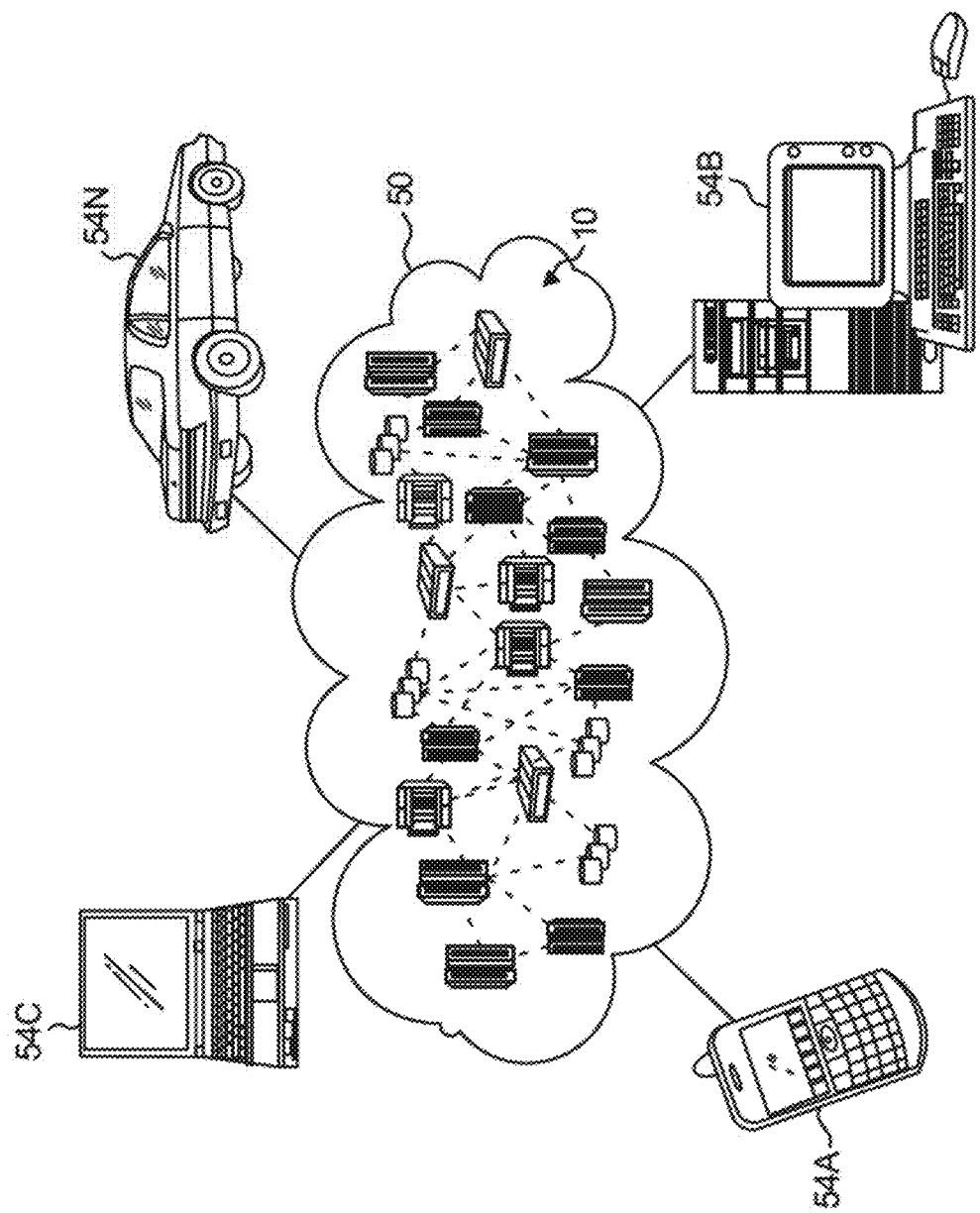
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
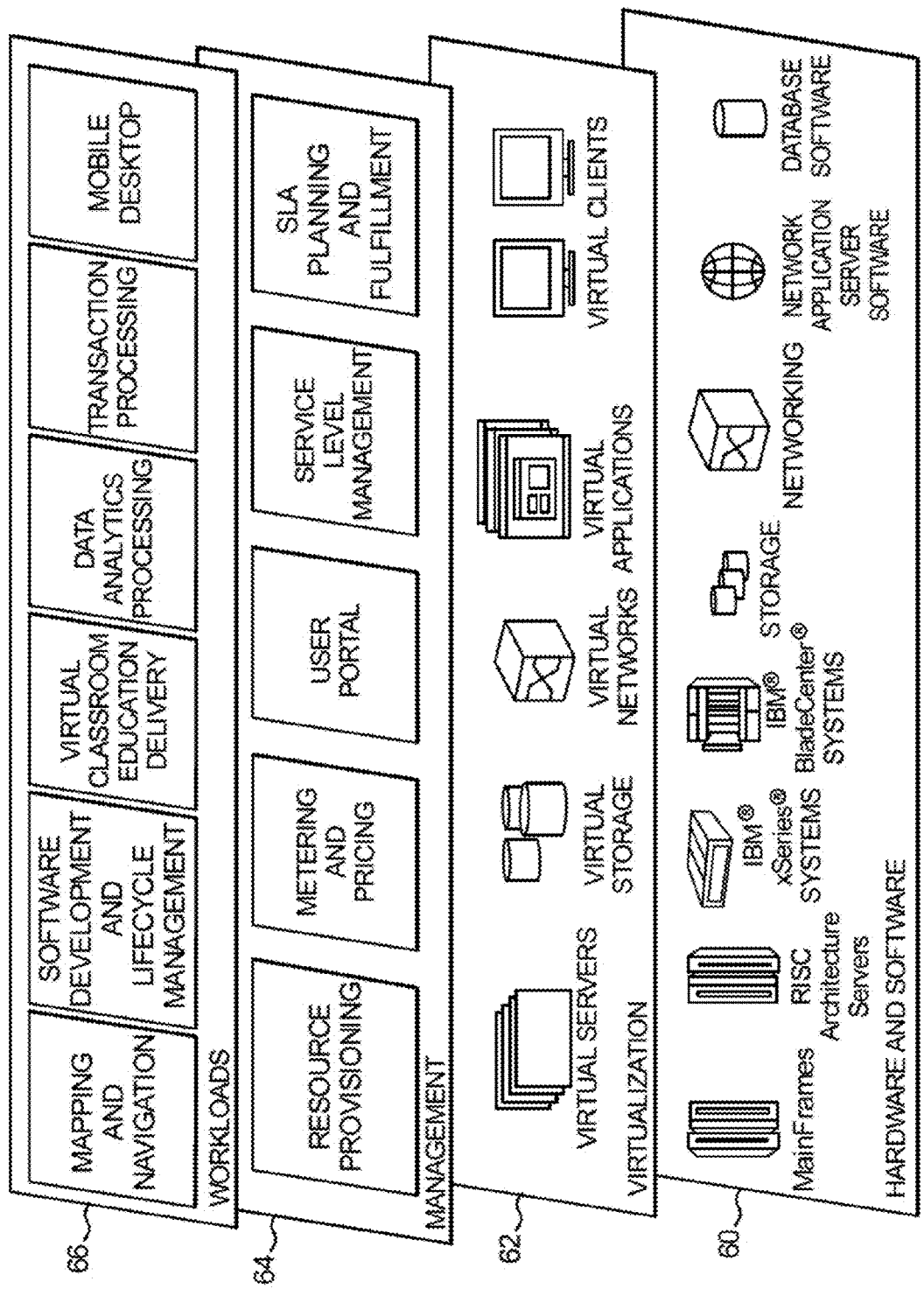
FIG. 3 depicts abstraction model layers according to an embodiment of the present invention.

FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

As noted, one pertinent security issue that public cloud computing platforms face today is that the active cloud virtual machine instances are visible and accessible via the public internet, which potentially allows hackers to carry out several types of attacks. Examples of such attacks include Denial of Service (DoS) and intrusion over long durations, which increase the probability of successful penetration. Most systems running on public cloud instances today are not security-hardened to withstand such persistent and long attacks. Attacks may potentially be harmful to the enterprise that uses such instances to deliver cloud services, for the users that use such services, and for the cloud provider that provides the cloud infrastructure.

One or more embodiments advantageously provide a network level access control solution that facilitates delivery of cloud services while protecting the network perimeter of the solution in a useable and dynamically customizable manner. One or more embodiments are applicable to any of the various cloud platforms available today. One or more embodiments provide not only a high level of security with no security attacks via network exposure on the services, but also significant savings on the cost of maintaining the security of such instances and services. One or more embodiments also address the challenges that network address translators (NATs) pose for network-based access control on public clouds.

Adoption of public computing models such as offered with today's cloud computing environments, brings with it new challenges of access control. Running in the public domain means anyone with internet access has access to your compute systems and their services, for bad or good. In traditional information technology (IT) environments that are on the customer's premises, firewalls and NATs prevent external unauthorized users from accessing the IT systems, servers and computing/storage/network nodes. However, cloud computing, which provides more cost-effective approaches to IT services hosting and management, makes the servers, computing/storage/network nodes visible to the external unauthorized users.

It is hard to keep a functional service running with strongest security measures in place. This is because cloud security is not a mature technology as of yet and the interplay between reliability and security and interoperability is not well-studied and well-developed in technologies as of yet.

One or more embodiments advantageously provide a network-level access control solution that facilitates delivery of cloud services while protecting the network perimeter of the solution in a useable and dynamically customizable manner. If the network perimeter is assured as secure with respect to the threat models adopted by the solution administration group, then the vulnerabilities cannot be exploited as easily as earlier. Following the defense-in-depth principle, it is important to secure network interfaces by using strong firewall-based security. The main question is—can we have a tool that is delivered as a service and is capable of applying access control—what hosts can access and what hosts cannot access by managing the firewalls of a cloud-based solution in several levels of granularity (from solution-level to instance-level) and with ease. Such a service can be used to register a solution and its instances, create security zones based on different levels of trust between the application components, as well as update the access control policy efficiently and easily.

There are several challenges in getting such an access control technology developed and used; some of them are— how to apply access control policies on each instance, how to manage the policies among different parts of the application, how to handle network-address translators, and how and when to schedule applying the policies and their updates.

Network address translators (NATs) influence the way such access control is carried out. NATs are used to hide the internal network, manage the network address space by using only a few public addresses, and to control how a remote host can connect to a host behind the NAT. While NATs support security and certain network functionalities, their non-standard implementations pose significant challenges on how to provide certain other functionalities—such as VoIP services as well as network-based access control technologies. For a host A behind a NAT to access a service at address B on cloud, A needs to have been registered/allowed access by the network-access control service for B. However, in the presence of NAT, address A is not what is visible to B or to the remote access control service. NAT translates A to A', which is a publicly routeable address and the binding A to A' is of limited lifetime. In order to B to be accessed by A, instead of the address "A", A' should be used. Moreover, A' changes dynamically and is assigned differently for different NATs. The question is how do we use the network-level access control for cloud services for clients behind NATs?

One or more embodiments provide such a network-based access control solution for public cloud services, applicable to any of the various cloud platforms available today. One or more embodiments provide not only high level of security with no security attacks via network exposure on the services, but also significant savings on the cost of maintaining the security of such instances and services. One or more embodiments also address the challenges that network address translators (NATs) pose for network-based access control on public cloud. One or more embodiments address one, some, or all of:

Network access control and its importance in cloud.
NATs and their relationship with CAM.
Using STUN to address NAT issues in Cloud Access Manager (CAM).
Deployment of the CAM solution for a real-world service delivered by a commercial cloud solution.

Cloud Access Manager

An exemplary Cloud Access Manager (CAM) is a working implementation of the public network access control functionality that is disclosed herein. The Cloud Access Manager provides policy zoned network-level access control as well as user registration capabilities that allow the dynamic and adaptable access control that are appropriate for use cases running on public networks, that is, in the type of networks used for public clouds.

Threat Model:

The data-center of a cloud service provider provides IaaS, PaaS and SaaS among other services. The objective of an attacker is to gain access to a VM instance or a service hosted on it in an unauthorized manner, to carry out denial of service attacks, to determine the way a cloud behaves. Suppose that a cloud-delivered service does not enforce network-level access control on some or all of its IP addresses. External hosts may carry out DoS attacks, port-scanning, as well as exploitation of vulnerable services running on the cloud-based host.

Real World Use Cases:

1) Single Cloud Deployments:

The least complex use case is that of deploying application instances to a single public cloud where the application has little to no requirement for access control from other than public IP addresses, that is, either access by other instances on the same cloud or access from general internet clients coming from non-translated public IP addresses. In these cases CAM can be used directly to establish access control using its control methods of zones, policies and application registrations.

The examples are many for this single cloud deployment case. There are a set of cloud instances running on a public cloud such as IBM's SmartCloud Enterprise or Amazon's Elastic Compute Cloud (EC2), that make up an application workload, running with public IP addresses, with access control essential to put up a network level perimeter around those instances so that unwanted probing or attacks are thwarted. One of the attractions to such public cloud scenarios is that the set of workload instances that make up the application will likely grow and shrink based on demand—this calls for automation such as CAM provides to update and maintain the membership of these transient cloud instances. CAM updates the firewall settings of all member instances in the application to include or remove these demand driven instances thus maintaining the access control necessary to have them participate fully in the intra-cloud communications required by the application. CAM policies can be defined to permit more general internet access, such as opening port 80 of a public web service application to serve the general public with access control in this case provided by standard authentication methods and use of SSL for encrypted exchanged of any credentials. Further, the CAM registrations can be used to provide access to the cloud application for specific public IP addresses.

Given there is overlap with this use-case and a more complex case of the hybrid cloud, now consider that case for more contrasting considerations.

2) Hybrid Cloud Deployments:

A hybrid cloud is an integration of traditional datacenter based IT environment with one or more clouds, on-premise and/or off-premise. A hybrid cloud can also be an integrated environment including private and public clouds, multiple private clouds, or multiple public clouds. A typical hybrid cloud scenario is the combination of private and public clouds that interoperate, allowing users of the private cloud to move some of the processing to the public cloud. This type integration helps users manage their peak workloads in the public cloud while processing normal and sensitive workloads on-premise. An example of a hybrid cloud environment is an integration of on-premise private cloud such as IBM PureSystems with a public cloud as referred to in the prior use case above. Hybrid cloud integration is facilitated by the hybrid cloud solution offering from IBM called IBM Service Management Extensions for Hybrid Cloud.

A workload may be processed using multiple virtual machine instances, some of which may be running web servers, application servers, Lightweight Directory Access Protocol (LDAP) and other management servers, while some other instances may be used to run databases and other data sources. In a hybrid cloud scenario all or a part of this topology of instances may be provisioned in the public cloud. In many cases, databases or management components used in the workload topology may be shared with other workloads or services that must remain on-premise. In such cases, the workload processed in the cloud may use existing data sources and management services provided from the existing on-premise components. In some other cases, these may be provisioned in the on-premise or private cloud environment for security, privacy, or compliance reasons.

In a multi-instance workload environment, such as the one described above, security and isolation requirements vary across the topology of the instances, depending on the functionality provided by the component and depending on the set of workloads served by that component. Proper administrative steps must be taken to ensure security and isolation policies are enforced at all times so that none of workloads or data sources are compromised and at the same time services are shared by multiple workloads. In particular, management instances have additional security constraints since these components run with higher privileges.

To minimize risk of exposure from the instances running in the inherently less secure public cloud environment, the establishment of role based security zones within a workload, which can be managed independent of the location of the actual instances, is appropriate in at least some embodiments. Using the services of CAM, separate access zones can be defined and instances can be managed independently within each zone using policies designed for the role of the instance. Using the concept of access zones described here, managing the access zones can be defined at the architectural level and implemented with greater degree of automation.

Figure 4:
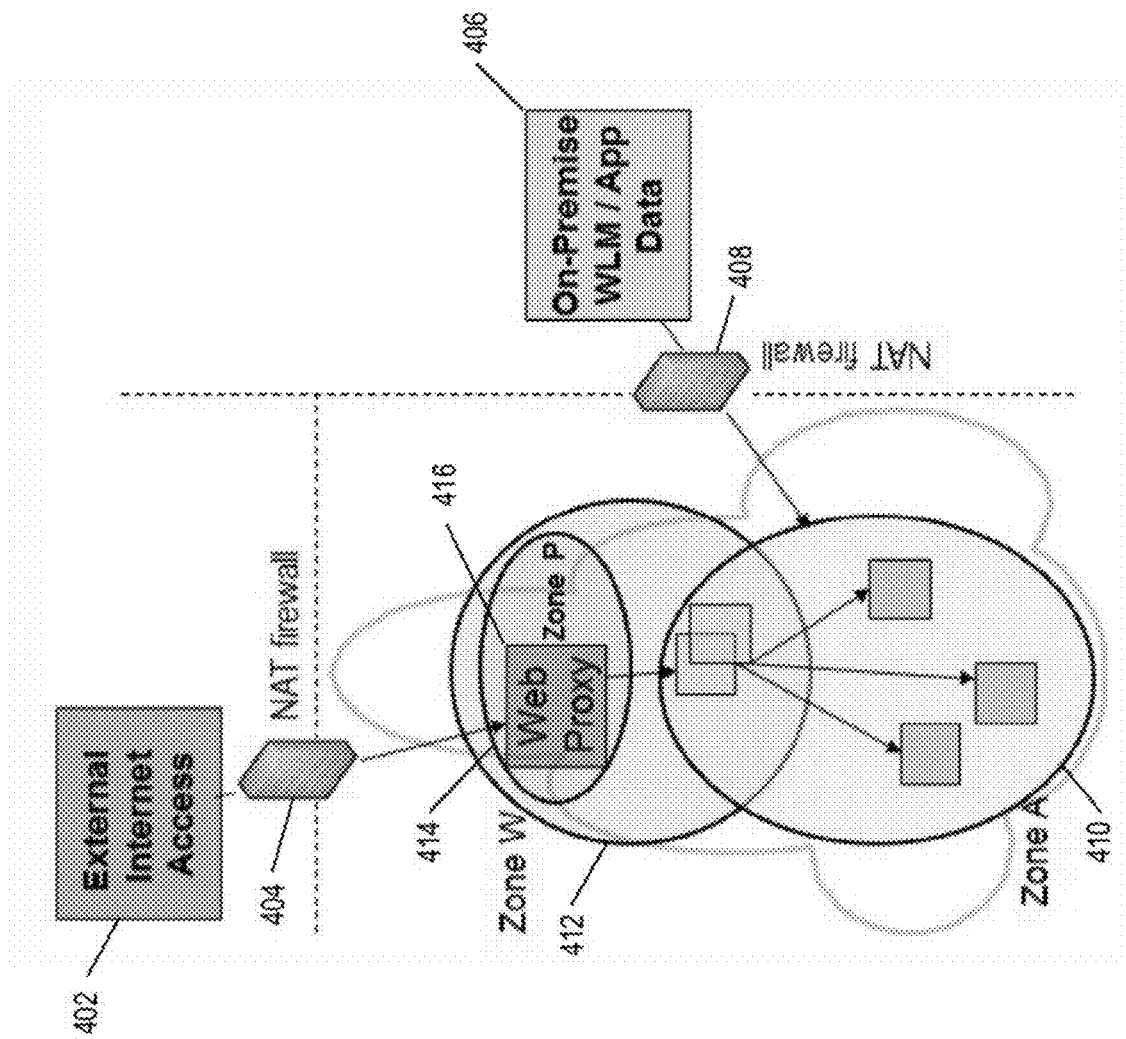
FIG. 4 shows an example of a multi-instance workload deployed in a hybrid cloud environment and managed for security according to an embodiment of the present invention.

FIG. 4 is an example of a multi-instance workload deployed and managed in a hybrid cloud environment. The instances in the left side of the figure are deployed in the public cloud and are managed by on-premise workload management systems 406, protected by NAT firewall 408. The instances in the public cloud may also access on-premise data sources and may also interact with other on-premise applications. The example shown in the figure represents a web server based application accessed via a proxy server. Three distinct access policies exist and the figure shows corresponding three access zones. Zone P 414 contains the web server proxy 416 which is defined with external internet access 402 via NAT firewall 404. Zone W 412 is a defined zone for one or more Web Servers with external access denied. Application servers are defined in Zone A 410 with external internet access denied but certain port access granted to customer enterprise workload manager and/or application servers. The network access policies require that the Proxy server can talk with Web servers and is accessible by internet; web servers cannot be accessed by internet but can be accessed by Web proxy as it is included in the Zone W and the application servers have access to/from web servers since web servers are included in the Zone A.

3) Real-time Network Configurations:

There are cloud usages involving real-time network configurations. For example, new ports are opened and closed based on real-time server activity on a cloud-hosted system. That requires appropriate access control to be enabled for such dynamic ports and IP addresses, if any. This use-case will be illustrated using an example real-world configuration.

Real-time media session setup is an additional use-case for CAM. Examples include voice or video sessions, either two-party or multi-party. Such sessions are typically set up through a signaling and control protocol such as SIP (Session Initiation Protocol). SIP sessions comprise a message exchange INVITE/OK/ACK between the caller and the called-party that is routed through a SIP server capable of session setup and session control. Commonly used open-source SIP session control servers include OpenSIP and Kamailio. In an environment where both endpoints are within the same domain, i.e. there are no intervening firewalls/NAT boxes, media flows between the endpoints once the INVITE/OK/ACK message exchange concludes and each endpoint thereby knows the IP address and port of the other. Once the conversation finishes, either endpoint can initiate a BYE/OK message exchange with the other and that stops each endpoint from sending media to the other. Prior to participating in a session setup, each endpoint needs to register a mapping of its SIP URI to its IP address, with the SIP server. The skilled artisan is familiar with the SIP protocol per se. Two pertinent aspects to note:

a) SIP messages are exchanged on a well-known port such as 5060, and the SIP server is expected to keep such a port always open to handle incoming session setup requests.

b) Media flows are set up dynamically—the media port on either endpoint is selected on a per-session basis and released after the session terminates.

Figure 5:
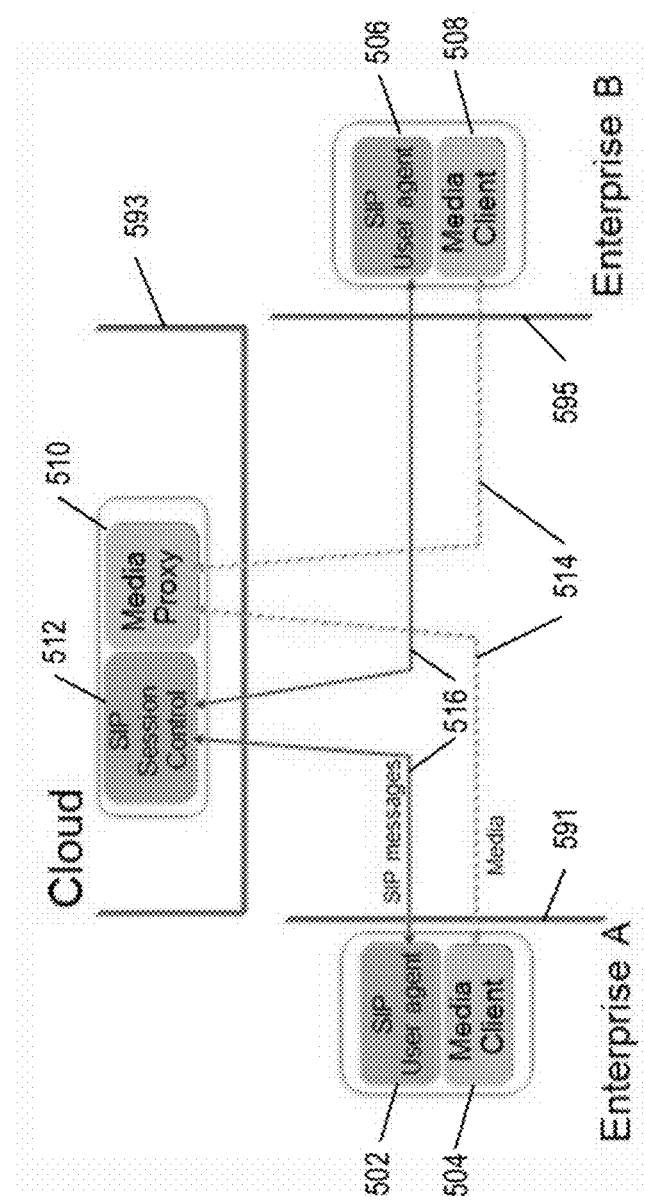
FIG. 5 shows real-time SIP and RTP communications according to an embodiment of the present invention.

A typical cloud-based environment for supporting real-time media session setup is shown in FIG. 5. Typically, the endpoints (Enterprise A, Enterprise B) of a conversation will likely belong to different network domains, with a firewall 591, 593, 595 protecting each domain, and a SIP session control server 512 hosted in the cloud. Enterprise A has SIP user agent 502 and media client 504, while Enterprise B has SIP user agent 506 and media client 508. Without going into the details of how SIP signaling needs to take care of the respective NAT/firewall for each domain, suffice to say that a common way for setting up sessions in such an environment is as follows: Each endpoint registers with the server 512 at a well-known port; the calling endpoint initiates the INVITE/OK/ACK message exchange endpoint to the same port on the server, which then forwards SIP messages 516 to the registered IP address of the called party. The media 514 is then exchanged between the two endpoints via the media proxy 510 on the cloud. As part of the INVITE/OK/ACK message exchange, the SIP server instructs each endpoint of a port number of the media proxy where to send media. Media proxy transfers media from one-endpoint to the other, acting as a rendezvous point that each endpoint can reach when they cannot reach each other directly. As before, once the conversation finishes, the assigned ports on the media proxy are released. Note this is in addition to assigned ports on the endpoints to send/receive media.

As the above brief summary demonstrates, a media session is established dynamically by allocating ports on the cloud based media proxy to receive media from either endpoint. This entails dynamically enabling network access to the media proxy at the allocated port from the corresponding endpoint, and then disabling the access after the conversation terminates. This is a function that CAM is well-suited to do. One or more embodiments modify the SIP server so that when the INVITE/OK/ACK message exchange concludes, the SIP server informs CAM of the selected ports of the media proxy and the IP address of the endpoint that will send media at the allocated port. CAM will then in real-time enable network access to those ports by modifying the firewall access control lists appropriately. Similarly, when the session terminates, CAM will disable network access to the media proxy from that endpoint.

Pertinent Aspects of CAM:

A system for network-level access control to cloud resources has the following requirements in one or more embodiments. The objective of CAM is to facilitate access to the IP address and port of a VM instance on cloud from only authorized IP addresses. Unauthorized clients cannot access such addresses. The security objective of this system is prevention from unauthorized access, port scanning, DoS, exploitation of vulnerabilities that are exposed by unprotected services.

Access control at IP-level: Access to a specific service on a VM instance should be carried at the level of IP addresses. IPv4 and IPv6 address formats as well as certain forms of regular expressions should be supported for expressing the IP-addresses that have access to a service.

White-lists and Black-lists: The default mode of access should be enabled by white-lists. However, there should be an added layer that prevents a set of IP addresses as represented by black-lists.

Multi-level access: A solution (application) deployed on one or more clouds may have multiple VM instances and services it uses. CAM should allow administrators to specify access to client IP addresses at the level of application granularity. When a client IP address should have access only to a certain subset of the application resources, CAM should allow configuration of access to such a sub-application level. A sub-application may contain only one VM instance or one service (IP address and port).

Efficiency of enforcing access rules: Access rules and updates to them can be enforced very efficiently and very fast.

Prevention of lock-out scenario: VM instances should have at least one port open (such as 22 for ssh) for the universal set of clients in order to prevent being locked out in the case of incorrect rules and/or software bugs.

IPTABLES should never be switched off even for a δ duration; otherwise it would allow attackers to access the VM instances and services during that period. Mechanisms should be used/developed in order to update IPTABLES or firewall without making it open to the public.

Transactional semantics should be enforced: in order to prevent non-deterministic behavior in concurrent update scenarios, CAM(s) should enforce serialization of the update requests from distributed CAMs. Moreover, rollback (atomicity) should be supported.

NAT traversal: CAM should be able to enforce access control rules on cloud resources such that the appropriate NAT-ed (translated) IP addresses of the clients are used.

DHCP-based IP addressing of cloud resources: Dynamic IP addresses of VM instances and cloud services should be used in enforcing access. (However, it along with NAT-ing (translation) leads to issues).

Registration and de-registration: Registration of client IP addresses and their de-registration should be supported in an ease-of-use manner. Moreover, de-registration should be carried out at a temporal/event-based manner.

NAT Considerations

Network address translators are used in network infrastructures in order to achieve several objectives: (1) Use private addresses and manage the network with only a limited number of public IP addresses: NAT provides a mapping from private IP address/port to a public address/port, (2) Hide internal network topology, and (3) Disallow connections initiated by a party external to the NAT to a party inside the NAT administered network, and allow connections initiated by a party inside the NAT-administered network, (4) In some NATs, mapping from internal IP address/port to public IP address/port is held for a brief period and needs to refreshed so that the mapping is not exploited by attackers. Items (2), (3) and (4) have security implications and protect the internal network from various attacks by reducing the attack surface and providing perimeter security. Firewalls work with NATs in order to apply network security policies.

The disadvantages of NATs are as follows: (1) the address of a host inside the network may not remain deterministic, which therefore makes it difficult for an external host to differentiate one internal host from another, or to identify the internal host by the IP address and port it sees, (2) NAT drops IP address/port mappings—pretty soon requiring refreshing mechanisms to be in place—which maybe considered as a waste of resources, howsoever miniscule that could be, (3) NATs are not standardized in terms of their functionalities nor in terms of their implementations. The lack of standardization is what is creating problems in network interoperability, enabling network technologies that are both useable and secure, and in upgrading network infrastructure without any concerns of breaking existing and deployed technologies.

Figure 6:
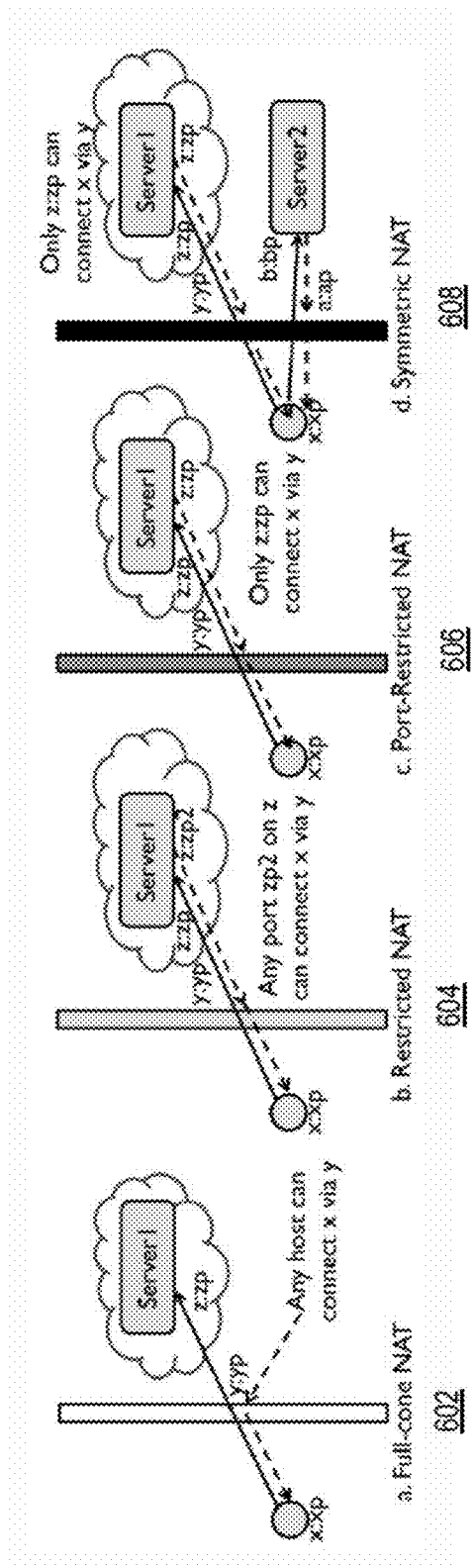
FIG. 6 shows examples of four types of NATs according to the prior art.

Referring now to FIG. 6, there are several types of NATs currently deployed on the network.

Full-cone NATs 602: An internal host x:xp initiates a connection to an external host z:zp. Internal host x:xp is assigned a public IP address y:yp. Once the mapping (x↔y) is created, "any" external host can connect to x:xp by using the public address y:yp as long as the mapping is established.

Restricted NATs 604: An internal host x:xp initiates a connection to an external host z:zp. Internal host x:xp is assigned a public IP address y:yp. Once the mapping (x↔y) is created, only the external host with IP address z but from any port on z (not only zp) can connect to x:xp by using the public address y:yp.

Port-Restricted NATs 606: An internal host x:xp initiates a connection to an external host z:zp. Internal host x:xp is assigned a public IP address y:yp. Once the mapping (x↔y) is created, only the external host with address z:zp can connect to x:xp by using the public address y:yp.

Symmetric NATs 608: An internal host x:xp initiates a connection to an external host z:zp. Internal host x:xp is assigned a public IP address y:yp. The address: port assigned by NAT changes if the destination address/port changes. In other words, if x:xp initiates connecting to b:bp as another external host, NAT assigns x:xp↔a:ap as a mapping for b:bp. Once the mappings are created, only the external host with address z:zp (b:bp) can connect to x:xp by using the public address y:yp (a:ap).

Static NATs: A host x is assigned a public IP y statically such that external hosts can access x via y.

Dynamic NATs: A host x is assigned a public IP y dynamically such that external hosts can access x via y. When the mapping is not refreshed, NAT drops the mapping. It may assign another address z from a set of available public IPs to x at a different time when x initiates a connection.

CAM Architecture

Figure 7:
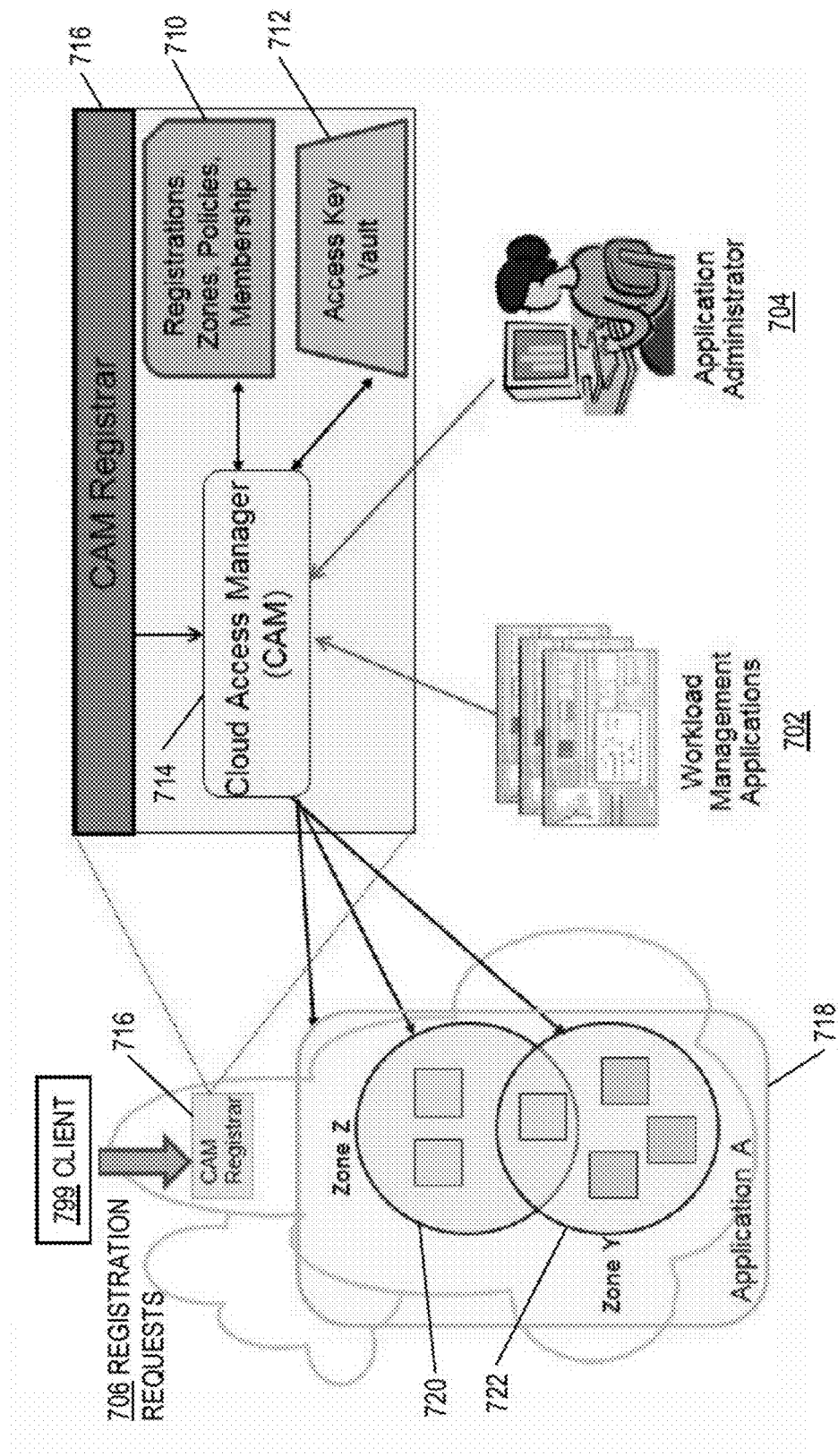
FIG. 7 shows an exemplary access control architecture of a cloud access manager according to an embodiment of the present invention.

The architecture of the access control components of the Cloud Access Manager (CAM) is depicted in FIG. 7. The Cloud Access Manager itself is a REST-based web service application which provides the necessary services to effect the network-level access control outlined in the Pertinent Aspects of CAM section above. Note that REST=representational state transfer.

CAM 714 receives direction from either an application administrator 704 using a graphical user interface, or from programmatic requests that come from workload managers 702 responsible for making the provisioning and de-provisioning requests to the cloud—that is, such workload managers include requests to CAM to establish the desired access controls for both instances newly provisioned as well as existing instances which need to be modified to accept new members or cleared of access to instances that have been removed from the cloud.

CAM maintains the configuration data 710 about applications, application registrations, access zones, zone membership, access keys and key files 712 which are provided to it via the REST API (application program interface) service requests. It uses all of this data to tell it what changes to make to the firewall settings on the zone members (cloud instances) to effect the desired controlled access.

The left hand side of the figure shows a public cloud such as IBM Smart Cloud Enterprise (SCE) or Amazon Elastic Compute Cloud (EC2) with a depiction of a deployed application 718, denoted as Application A. Within this application there are two application zones defined, Zone Y 722 and Zone Z 720. Each of these zones encompasses a number of deployed virtual machine instances. These zones are the Access Zones managed by CAM 714. To illustrate further this example shows a single VM instance (not separately numbered to avoid clutter; resides in intersection of circles for Zones Y and Z) that resides in both of the access zones, that is, it is a member of both zones and has access to the other VM instances in both zones. The other VM instances have access to only those members of the zone that they are a member.

Also shown running in the cloud is the CAM Registrar 716 (note registration requests 706 from one or more client(s) 799). The registrar serves to enable dynamic access to clients to the applications running in the cloud. The registrar is used by a client to authenticate to a specific application and thereby be granted network-level access to the VM instances that make up that application. When the client is authenticated, the registrar directs CAM to add the client's IP address to access control lists of the instances that are members of the application—thereby dynamically enabling access to the registered client.

The CAM Registrar 716 is architected to run in the cloud so that it can properly register the IP address of the client as seen by the cloud. With Network Address Translation (NAT) that is common when crossing the boundaries from private networks into the public network domain, the IP address of a client that crosses one or more of these NAT boundaries is not the same as the local private IP address—thus, to be able to be controlled, the address registered with CAM needs to be the one that the cloud VM instances will recognize.

On the other hand, CAM itself can operate either from the cloud, i.e. running together with the CAM Registrar, or it can run separately, for instance from a secured location that has been granted access by the Registrar component. The consideration here is the need for more containment of CAM given its vault of access keys for the updating of the application member instances. While CAM secures these keys in an encrypted vault, if there is any question of vulnerability running the public cloud, it can be moved to the security of a more controlled environment—again, just requires the Registrar to access it (e.g. secured channel for instance).

Generalized Architecture with STUN Capabilities:

NATs pose significant challenges in applying access control based on client host IP-addresses. CAM, in order to apply the access control requirements, should know the exact address at which the client is going to reach a host. Let the client be available at x:xp, and the host is at z:zp. Because of the NAT behind which x is communicating with z, z knows that someone with address y:yp is communicating with it, and not from x:xp. This address y:yp—NAT-ed address of x:xp needs to be used by CAM in order to allow x:xp to access the server at z:zp. In case of non-full-cone NATs, the NAT-ed IP-address of x changes as the destination host outside the NAT changes (as shown in FIG. 6). Therefore, it is appropriate to determine the actual address y:yp, so as to facilitate CAM to enforce the firewall policies appropriately allowing x:xp.

STUN:

STUN—Session Traversal Utilities for NATs, is a standardized protocol (RFC 5389) that is used to facilitate NAT traversal. NAT traversal is the process of determining the public address assigned to a client behind NAT when the client is accessing a server that is outside the NAT. A STUN-enabled server implements the protocol of STUN so that it can inform the client of its NAT-ed (i.e., server-reflexive) address. Given that there are different types of non-standardized NAT behavior as discussed earlier, STUN is used by the clients and services in order to determine its NAT-ed addresses and use them in the communications. Moreover, the NAT bindings are short-lived. Therefore, if the server needs to connect back to the client later or vice versa using the same NAT-ed address of the client, then the NAT binding should be kept alive. The keep-alive messages should be sent by the STUN-enabled service to the client or vice versa with an ACK being returned from the recipient; such a round-trip communication helps keep the NAT binding active.

Using STUN for CAM:

In the case of CAM, when a client is behind NAT and intends to access a host in the cloud outside the NAT, then the client should be authorized by CAM to do so. However, to do that, CAM needs to know the NAT-ed IP address and port number from which the host receives the request from the client. For example, in FIG. 6 at 602, client x:xp communicates with host z:zp. However, z:zp receives the request from y:yp, which is the NAT-ed IP for x:xp. If CAM is enabled for z:zp, then for x to be allowed to communicate with z, CAM should know that a client with address y:yp would intend to access z, and such a connection should be allowed.

However, NAT-ed addresses are assigned dynamically unless it is a static NAT. In those cases, the client has to first create such a NAT binding, determine its NAT-ed address, and inform that address to CAM with authorization credentials for CAM. The NAT binding has also to be kept alive from that point onwards till the end of any communication that x:xp can foresee from that NAT-ed IP address. Determination of NAT-ed IP address can be carried out using STUN protocol. So using STUN, in general there are the following steps that need to be carried out in order to handle the problem of NATs for CAM usage.

STUN-enable the host that needs to be administered access control by CAM. This is done by running a STUN server that receives each STUN request sent to any port on that host. Let x:xp be the client and z:zp be the service running on cloud that x intends to access. The following are the steps that are used to use CAM to allow, revoke, and/or expire permissions.

Allow:
1) Client x:xp sends a STUN request to the service running at z:zp.
2) STUN service running at z:zp responds to x:xp with the response "y:yp" as its NAT-ed ip.
3) STUN service starts the keep-alive messages for "y:yp"—messages are sent to y:yp every $\delta$ seconds in order to keep the NAT binding (x:xp$\leftrightarrow$y:yp) active at the NAT.
4) CAM is informed about the address y:yp. It allows y:yp access to z:zp if the request for permission is authorized.

Revoke:
1) Client x:xp determines that it is not going to use the service at z:zp any more and wants to de-register y:yp from the CAM so that another client who is assigned y:yp by the NAT does not gain unauthorized access to z:zp.
2) Client x:xp informs STUN service at z to stop sending keep-alive requests.
3) If STUN is modifiable, then modify STUN protocol such that x can ask STUN server to stop sending keep-alive messages after an event has occurred. If such a modified STUN is used, then the client does not have to request STUN to stop keep-alives.
4) CAM is informed that y:yp should be revoked permission to access z:zp.

CAM should have attributes such as "lifetime" of a permission, and the events that can be used to revoke a permission, such as a timer event or receiving too many requests from a client over a short period of time. To that end, there should also be associated a limit in the number of request originating from the client at y:yp for z:zp. If z:zp informs CAM that y:yp is sending more requests that allowed, then CAM may revoke the permissions or carry out other actions based on access control policies. The latter is to prevent DoS attacks.

Figure 8:
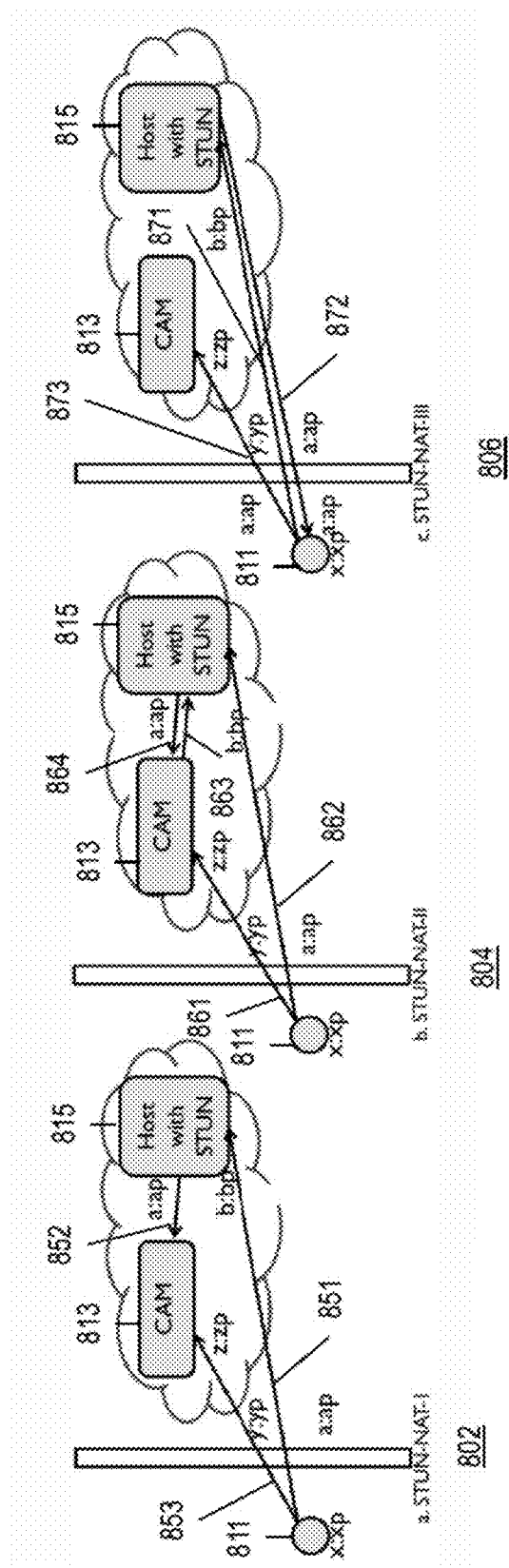
FIG. 8 shows exemplary architectures for CAM using STUN according to an embodiment of the present invention.

Architectures:

Consider exemplary concrete steps that are used to implement the general methodology suggested in the previous section. Refer to FIG. 8.
1) Architecture-I: As seen generally at 802, in step 851, Client 811 sends a request to access z:zp, where there is a CAM-aware service 813 running along with STUN service 815. In step 852, the CAM-aware service uses the STUN-determined address and informs CAM about the NAT-ed IP a:ap of x:xp. In step 853, CAM gets the client authorized and if it has the authority, adds a:ap to the allowed list of clients that can use the service running at z:zp, and configures the firewall of z appropriately.

2) Architecture-II: As seen generally at 804, in step 861, Client 811 sends an authorized request to "access z:zp" to CAM, which returns a token µ to the client if authorized. In step 862, client 811 sends an access request to z:zp and the token µ. In step 863, CAM 813 asks the CAM-enabling service at z:zp about the client with token µ; while in step 864, the service at z:zp informs CAM about the NAT-ed IP a:ap corresponding to µ and then CAM adds a:ap to the allowed list of clients that can use the service running at z:zp, and configures the firewall of z appropriately.

3) Architecture-III: As seen generally at 806, in step 871, Client 811 sends STUN request to z:zp; in step 872, the STUN service at z:zp informs the client x:xp about the NAT-ed IP a:ap; and in step 873, the client authorizes it to CAM and sends a:ap as its NAT-ed IP address from which it would access z:zp, and if it has the authority, CAM adds a:ap to the allowed list of clients that can use the service running at z:zp, and configures the firewall of z appropriately.

Revocation: If the STUN server at z:zp does not receive any ACK message from the client for one or more its keep-alive messages, then the CAM-enabling service at z:zp sends a revoke message to CAM for revoking a:ap from the list of allowed clients to access the service at z:zp. The client may ask CAM to revoke permissions to a:ap from accessing z:zp. The lifetime or event-based revocations may also be used. In cases where the client is quite mobile or the client does not send revocation requests, CAM should use STUN protocol to contact the CAM-enabled service or STUN service at z:zp and determine whether the client has been authorized recently or is accessing the service. If none of them is true, then revocation proceeds. Authentication protocols in and of themselves are well-defined and well-known in literature; given the teachings herein, the skilled artisan will be able to adapt one or more to implement one or more embodiments.

Analysis:

Architecture-I requires involvement of the service in terms of its CAM-enablement, and the client need not be a STUN-enabled client. Architecture-II requires involvement of the service (as in I) as well as the CAM—CAM needs to talk to the CAM-enabled services to get ALLOW working. However, the total number of messages for an "ALLOW" is more than the ones in I and III. Architecture-III does not require any modifications to the service for CAM-enabling it or does not add much load to the services being hosted on the cloud. It puts all the actions at the client-side. Architecture-III relatively reduces the chance that the client would be a DoS attacker because it has to do the most of processing. Architectures I and II lead to messages between the service and the CAM thereby increasing the effectiveness of a DoS attack—because for one request from the client, there are one more, and two more requests in I and II, respectively between the CAM and the CAM-enabling service. In general, the approach I is believed to be most appropriate, while for resource and energy-constrained clients, II or III would be better.

CAM Implementation

Figure 9:
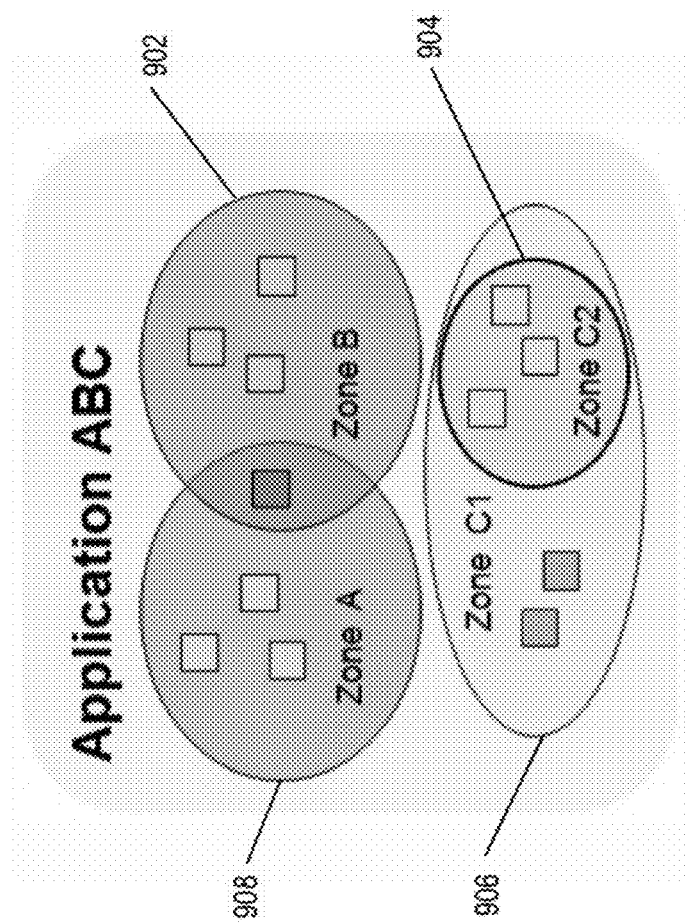
FIG. 9 depicts CAM application, zones and zone members according to an embodiment of the present invention.

The Cloud Access Manager (CAM) is an exemplary implementation to provide the type of network-level access control highlighted in the requirements outlined in the Pertinent Aspects of CAM above. It serves to provide access control by automating the configuration of the network level access firewalls on the cloud instances (virtual servers) that it has been charged with oversight responsibilities. The instances, referred to as application members, that it manages are VM instances running in a public cloud where such access control is most essential. It provides an administrator level user interface as well as REST-based API for establishing access zones, defining zone policies, and updating zone membership. The policies that it applies come from specifications to CAM by means of administration configuration or authenticated user registrations. They are applied to the cloud members in the form of a set of firewall rules that serve to limit network level access to match what is configured by the CAM access policy specifications. Following are details of the control components of the Cloud Access Manager:

1) Access Zones:

Access zones have two forms of access control specification. The first, zone membership, is implicit in that if a cloud instance (virtual machine) is made a member of a zone it will be granted access to all other members of that zone and those members will be granted access to it. As depicted in FIG. 9, a cloud instance can be a member of more than one access zone: refer to the member that is in the intersection of the circle representing Zone A 908 and Zone B 902. In this case, that cloud instance has access to all members of both zones as it is a member of both. The other members have access to this member.

Referring again to the FIG. 9, it can be seen that access zones are well depicted by set inclusion Venn diagrams. Looking at zones C1 906 and C2 904, this depicts a method to have a set of members have one set of policies while still gaining access to another set of VMs. In detail, members of zone C2 can have a set of policies which are not shared with the other members of the out zone C1 but since all of zone C2 is a subset of C1, all members of C1 and C2 have access to each other. This notion of having groups as policy-groups and others as non-policy groups makes for a flexible technique to define the necessary access control environment.

2) Zone Policies:

The other form of access control specification provided to access zones is the explicit specification of zone policies which are defined to provide additional access beyond that of the zone membership just described. These can be defined in the form of typical firewall specifications such as permitting access by a specific IP address or range of IP addresses or access to a given port or range of ports. The exemplary CAM implementation uses IPTABLE firewall rule specification formats to define these policies. These policies define additions in access to be added, versus any restrictions in access. The model employed for policies is to start with a base configuration profile that only permits inbound access via a secured port, port 22, used by SSH, SCP protocols, and to that base, the various access definitions provided by CAM (e.g. including the access zone policies and zone membership) are added to permit (or open up) other access to the included member cloud instances. To avoid lock-out conditions, the secured port 22 for SSH access is always enabled.

3) Application Registrations:

Additionally, CAM provides for dynamic application access via authenticated user requests. Applications can be configured via the administrative UI or API to bound a set of access zones and zone members. The user registers with CAM Registrar function by selecting the application of interest and authenticating with an application specific password. Their registered IP address will be dynamically granted access by means of CAM updating the firewall rules of the members of the zones configured as part of the application.

4) Access Keys:

CAM automates the specified changes to access control on zone members by using access keys to perform the necessary firewall updates. These keys are configured via the administrative interfaces for CAM and are maintained securely in a key vault. CAM is entrusted with private key files which are used to perform its automated duties of controlling the zone members in its charge. These key files are associated to a CAM Access Key of which there are two types: i) application-level access key which is defined to be used for all members of the defined application, and ii) member-level access key which is used to specify a key file that is to be used for a specific member cloud instance. With the more specific member-level key used if specified, otherwise the application-level key will be used.

Figure 10:
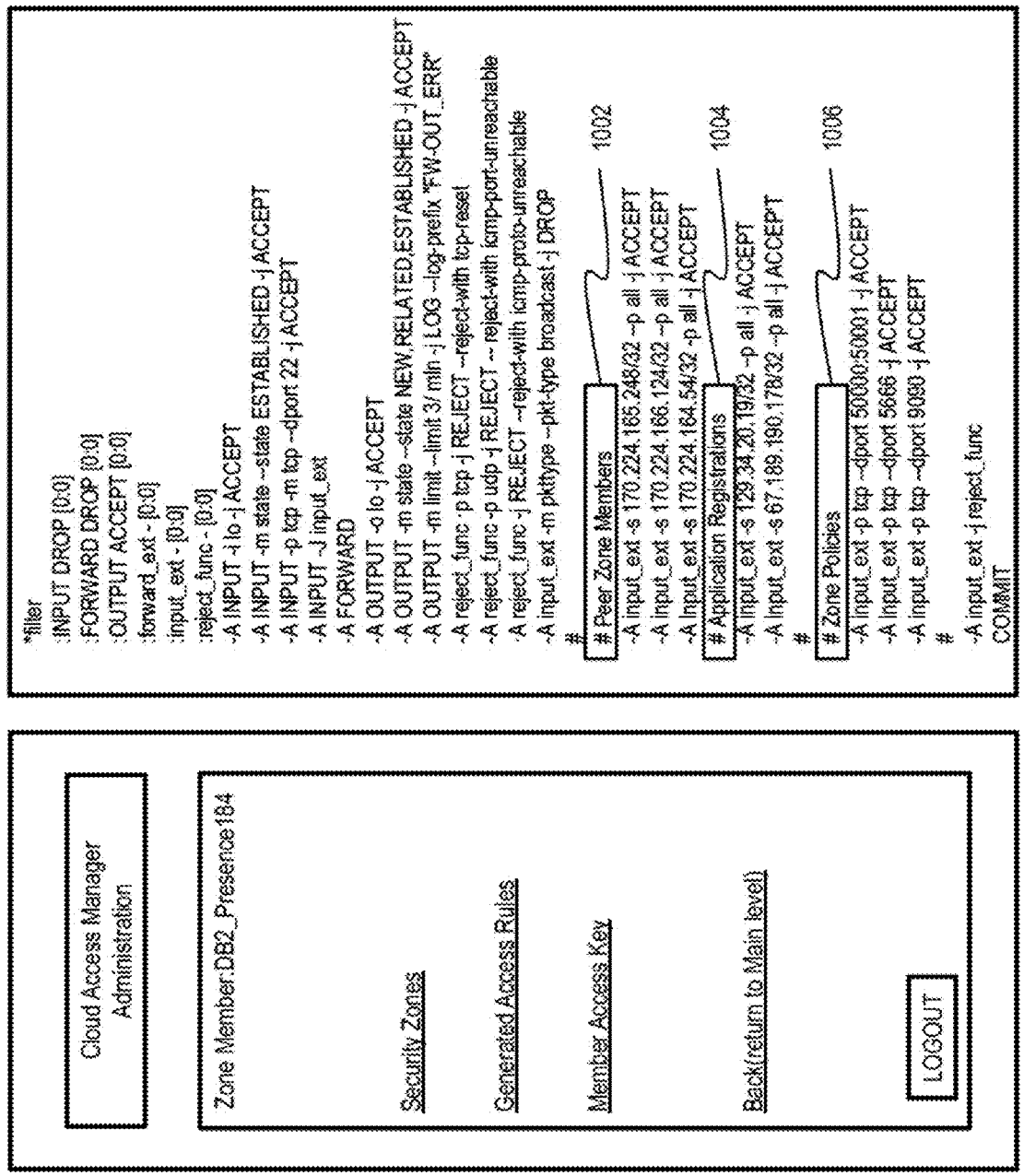
FIG. 10 shows generated firewall rules generated by CAM as viewed from the CAM administrator user-interface according to an embodiment of the present invention.

By way of example, FIG. 10 summarizes the above implementation detail by showing a set of firewall rules as generated by CAM for a single cloud instance and displayed on the CAM application administrator user-interface. The headings 1002, 1004, 1006 show the various sections of access control that have been discussed herein, those being the implied zone membership rules, application registrations, and the explicit zone policies. The rules at the top are ones which define the base limited access set to which the other rules are additive in granting more access than the base.

Referring again to FIG. 7, consider that CAM 716 registers the IP address from which the client request 706 of client 799 is actually coming in. Due to NAT behavior, however, the IP address that CAM 716 sees is not what the application component sees. NATs do not allow client addresses to be used as-is for network-based access control. One or more embodiments provide methods to carry out network-based access control using the STUN protocol or such other protocols. One or more embodiments address NAT issues and how to use STUN or similar protocols to provide access control in the presence of NATs. One or more embodiments add new functionalities to STUN, such as the ability to handle authentication tokens from client-CAM and/or to compute and verify hashes and digital signatures. One or more embodiments make cloud images STUN-enabled.

Some embodiments address multiple zones in the cloud, each with a single instance of a virtual machine (VM). These can be configured, for example, using CAM to provide certain levels of firewall protection. There are situations with more than one instance in a zone. The number of instances in a zone may be determined at runtime, for example. In one approach, every time another instance is added, configure that instance, configure the client, and configure other instances that need to communicate with the new instance that it is desired to add. It will be appreciated that changing the number of instances in a zone can result in significant complication.

Figure 11:
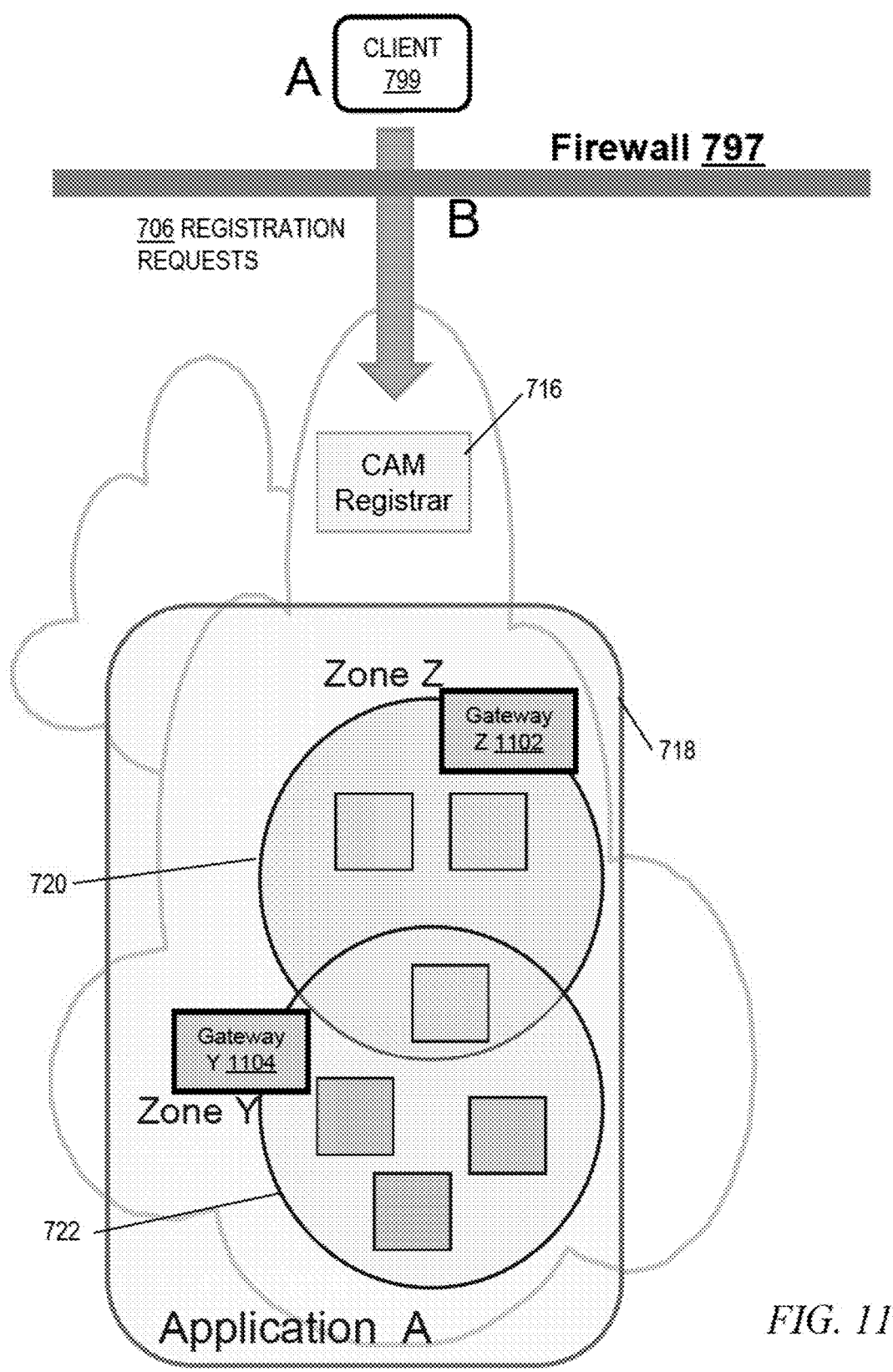
FIG. 11 shows gateway-based protection zones according to an embodiment of the present invention.
Figure 12:
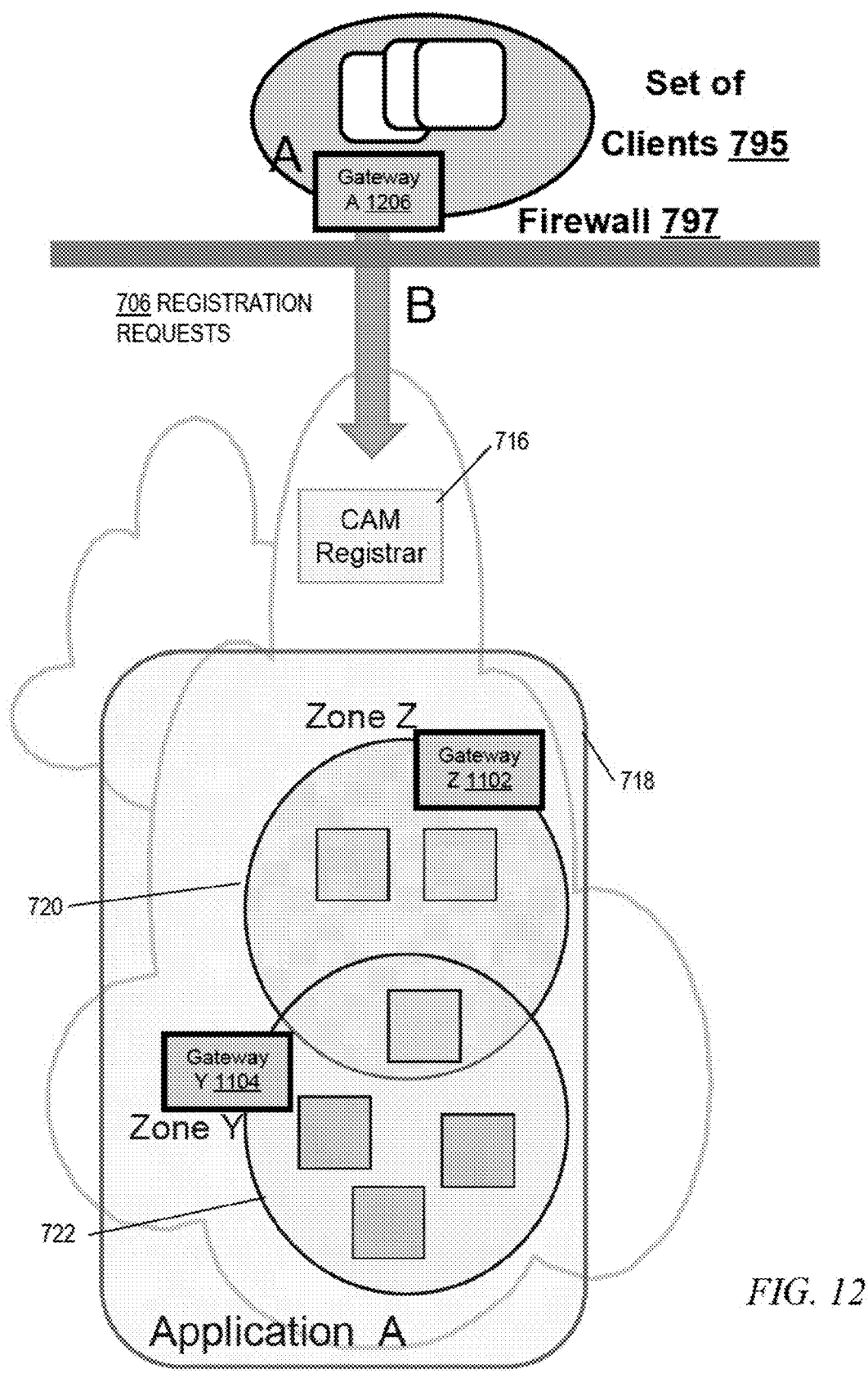
FIG. 12 shows a gateway for multiple clients according to an embodiment of the present invention.

One or more embodiments address this complexity by adding the notion of a gateway to the zone. Attention should now be given to FIGS. 11 and 12, wherein elements similar to those in FIG. 7 have received the same reference characters. Note firewall 797. A zone 720, 722 is defined with certain rules, including which clients 799 can communicate with which IP addresses, what ports should be opened, and so on. In one or more embodiments, every time a zone is defined with policies, create a gateway 1102, 1104, which is STUN-enabled. Once the gateway is defined, it is possible to add instances in the zone without making any changes on the client side or in the gateway. This enhances the manageability of adding new instances. FIG. 11 shows an exemplary technique for configuring the zones with gateways. FIG. 12 shows the more general case where there are not only multiple zones with one or more instances, but also for multiple clients, handled with a gateway on the client side.

In particular, consider gateway-based protection zones as shown in FIG. 11. Each gateway is for one protection zone (i.e., gateway 1102 is for Zone Z 720 and gateway 1104 is for Zone Y 722), and each gateway receives requests from client(s) 799 and forwards those requests to respective components in the zone. Each gateway is STUN-enabled. Techniques discussed elsewhere herein can be used to register a client for accessing the protection zone. In an exemplary method of configuring clients as depicted in FIG. 11, deploy a gateway GW(A) per protection zone A, including one or more servers (zone "A" here is intended to refer to any given zone, e.g., Zone Y, Zone Z, etc.). Let the IP address of GW(A) be IP(GW(A)). CAM stores a table, where each row refers to a protection zone—gateway and the set of servers in that protection zone. When a client wants to get access for a server, CAM determines the gateway assigned to the server from the table, and registers the client. The client can be registered by applying any of the methods in FIG. 8 in order to register client Client-X with respect to IP(GW(A)). That is to say, Client—X needs to be given access to GW(A) by CAM. Using CAM, configure all servers in protection zone A by applying access rules (firewall rules) to IP(GW(A)) such that the gateway GW(A) has access to all servers of zone A at appropriate ports/protocols. As earlier, all servers in zone A can communicate with each other, if that is needed by access policies. Clients are not permitted to communicate directly with the servers in Zone A. Clients can communicate with servers only via the Gateway.

Consider now a gateway 1206 for multiple clients as in FIG. 12. Each gateway 1206 is for a set of clients 795 within the same network, and each gateway 1206 receives requests from client(s) and forwards those requests to the respective component or the gateway 1102, 1104 in the zone Z or Y. Each gateway 1206 is STUN-enabled. Techniques discussed elsewhere herein can be used to register a client for accessing the protection zone. In an exemplary method of configuring clients as depicted in FIG. 12, deploy a gateway GW(A) per set of clients A: including more than one server (a set of clients "A" here is intended to refer to any given set of pertinent clients). Let the IP address of GW(A) be IP(GW(A)). Apply any of the methods in FIG. 8 in order to register GW(A) as a client with respect to IP(GW(Z)); i.e., GW(A) as a Client needs to be given access to GW(Z) for protection zone Z by CAM. Manually or by other techniques, configure all clients in set A by applying access rules (firewall rules) to GW(A) such that the requests from any client in A to any server in Z go to gateway GW(A), which then forwards same to GW(Z), which has been given access to all servers of zone Z at appropriate ports/protocols as per the earlier method.

Consider, for cloud images, that if an instance is being created that needs to be access controlled by the CAM, add a STUN module to the instantiation process, enable STUN for the appropriate services on the instance, and configure STUN to handle CAM capabilities.

It will thus be appreciated that one or more embodiments provide a method to provide network-level access control, especially as it relates to the public cloud space, using the STUN protocol or such other protocols to determine and then enable effective IP addresses as affected by various forms of Network Address Translation that occur at enterprise boundaries. One or more embodiments are applicable to private data centers as well when there are NATs deployed within the enterprise. Some embodiments provide a method to provide tracking and provenance regarding WHAT are the clients that accessed network-based resources and WHEN. Some embodiments provide a method to de-register clients from accessing a resource based on dis-association from a network and/or based on duration of access (an upper bound on when the access expires).

One or more embodiments thus advantageously allow access control for clients behind NATs for services that the clients want to access. The clients want access to servers divided into protection zones. Clients are behind NATs, which change the IP address for clients as seen by the servers. Therefore, the access control at servers uses the IP address of the client that the servers can see. One or more embodiments achieve this by using STUN. One or more embodiments thus provide a method, computer program product, and/or apparatus for managing control of access of servers by clients behind NATs.

Given the discussion thus far, it will be appreciated that, in general terms, an exemplary method, according to an aspect of the invention, includes the step obtaining, at a cloud access manager 714 executing on at least one hardware processor, input regarding access control for at least one application 718 deployed on a plurality of virtual machine instances in a cloud computing environment. A further step includes, with the cloud access manager executing on the at least one hardware processor, dividing the plurality of virtual machine instances into at least first and second access zones 720, 722 in accordance with the input. A still further step includes registering, with a cloud access manager registrar 716 located in the cloud computing environment, internet protocol addresses of external clients as seen from the cloud computing environment. At least some of the registered internet protocol addresses are public internet protocol addresses assigned to the clients via network address translation (NAT). Yet a further step includes carrying out session traversal utility for network address translation (STUN) to determine the public internet protocol addresses assigned to the clients via the network address translation. An even further step includes, with the cloud access manager executing on the at least one hardware processor, controlling, based on the registered internet protocol addresses, (i) access of external clients 799 to the plurality of virtual machine instances, and (ii) access of the plurality of virtual machine instances to each other, in accordance with the access zones. The control is such that:

those virtual machine instances in the same given one of the access zones have access to each other;

the external clients are permitted a first level of access to those of the virtual machine instances in the first access zone, according to a first policy; and the external clients are permitted a second level of access, different than the first level of access, to those of the virtual machine instances in the second access zone, according to a second policy.

A "level of access," as used herein, including the claims, includes prohibition of access unless expressly recited to the contrary.

In some cases, the obtaining comprises obtaining from an application administrator 704 via a graphical user interface. In some cases, the obtaining comprises obtaining from a workload management application 702.

In some cases, the at least one hardware processor, on which the cloud access manager executes, comprises at least one hardware processor of the cloud computing environment. On the other hand, in some cases, the at least one hardware processor, on which the cloud access manager executes, comprises at least one hardware processor of a secured location remote from the cloud computing environment.

In some cases, the controlling step is implemented via access keys 712.

Referring to FIG. 11, in some instances an additional step includes providing at least one of the first and second access zones 720, 722 with a zone gateway 1102, 1104. The external clients 799 are only permitted to access those of the virtual machine instances in the access zone(s) having the zone gateway(s) via the zone gateway(s).

Referring to FIG. 12, in some instances an additional step includes grouping at least some of the external clients into a set 795 and providing the set with a client-side gateway 1206. The external clients in the set are only permitted to access the plurality of virtual machine instances (e.g., in Zone Y or Z) via the client-side gateway 1206.

It should be noted that any of the methods described herein can include an additional step of providing a system comprising distinct software modules embodied on a computer readable storage medium; the modules can include, for example, any or all of the appropriate elements depicted in the block diagrams in any of the pertinent figures and/or described herein; by way of example and not limitation, any one, some or all of the modules/blocks and or sub-modules/sub-blocks in FIG. 7, such as CAM 714 and CAM Registrar 716, with elements 710 and 712 as well. In some embodiments, a suitable UI is provided in the form of a GUI comprising html served out to the browser of a user's computer. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
obtaining, at a cloud access manager executing on at least one hardware processor, input regarding access control for at least one application deployed on a plurality of virtual machine instances in a cloud computing environment;
with said cloud access manager executing on said at least one hardware processor, dividing said plurality of virtual machine instances into at least first and second access zones in accordance with said input;
registering, with a cloud access manager registrar located in said cloud computing environment, internet protocol addresses of external clients as seen from said cloud computing environment, at least some of said registered internet protocol addresses comprising public internet protocol addresses assigned to said clients via network address translation;
carrying out session traversal utility for network address translation to determine said public internet protocol addresses assigned to said clients via said network address translation;

with said cloud access manager executing on said at least one hardware processor, controlling, based on said registered internet protocol addresses:
 access of said external clients to said plurality of virtual machine instances; and
 access of said plurality of virtual machine instances to each other;
in accordance with said access zones, such that:
 those of said virtual machine instances in a same given one of said access zones have access to each other;
 said external clients are permitted a first level of access to those of said virtual machine instances in said first access zone, according to a first policy; and
 said external clients are permitted a second level of access, different than said first level of access, to those of said virtual machine instances in said second access zone, according to a second policy.

2. The method of claim 1, wherein said obtaining comprises obtaining from an application administrator via a graphical user interface.

3. The method of claim 1, wherein said obtaining comprises obtaining from a workload management application.

4. The method of claim 1, wherein, in said obtaining, dividing, and controlling steps, said at least one hardware processor, on which said cloud access manager executes, comprises at least one hardware processor of said cloud computing environment.

5. The method of claim 1, wherein, in said obtaining, dividing, and controlling steps, said at least one hardware processor, on which said cloud access manager executes, comprises at least one hardware processor of a secured location remote from said cloud computing environment.

6. The method of claim 1, wherein said controlling step is implemented via access keys.

7. The method of claim 1, further comprising providing at least one of said first and second access zones with a zone gateway, wherein said external clients are only permitted to access those of said virtual machine instances in said at least one of said first and second access zones having said zone gateway via said zone gateway.

8. The method of claim 7, further comprising grouping at least some of said external clients into a set and providing said set with a client-side gateway, wherein said external clients in said set are only permitted to access said plurality of virtual machine instances via said client-side gateway.

9. A computer program product comprising a computer readable storage medium having program instructions embodied therewith, the program instructions being executable by a processor to cause the processor to:
 obtain input regarding access control for at least one application deployed on a plurality of virtual machine instances in a cloud computing environment;
 divide said plurality of virtual machine instances into at least first and second access zones in accordance with said input;
 register internet protocol addresses of external clients as seen from said cloud computing environment, at least some of said registered internet protocol addresses comprising public internet protocol addresses assigned to said clients via network address translation;
 carry out session traversal utility for network address translation to determine said public internet protocol addresses assigned to said clients via said network address translation;
 control, based on said registered internet protocol addresses:
  access of said external clients to said plurality of virtual machine instances; and
  access of said plurality of virtual machine instances to each other;
 in accordance with said access zones, such that:
  those of said virtual machine instances in a same given one of said access zones have access to each other;
  said external clients are permitted a first level of access to those of said virtual machine instances in said first access zone, according to a first policy; and
  said external clients are permitted a second level of access, different than said first level of access, to those of said virtual machine instances in said second access zone, according to a second policy.

10. The computer program product of claim 9, wherein said obtaining comprises obtaining from an application administrator via a graphical user interface.

11. The computer program product of claim 9, wherein said obtaining comprises obtaining from a workload management application.

12. The computer program product of claim 9, wherein, in said obtaining, dividing, and controlling steps, said at least one hardware processor, on which said cloud access manager executes, comprises at least one hardware processor of said cloud computing environment.

13. The computer program product of claim 9, wherein, in said obtaining, dividing, and controlling steps, said at least one hardware processor, on which said cloud access manager executes, comprises at least one hardware processor of a secured location remote from said cloud computing environment.

14. The computer program product of claim 9, wherein said controlling step is implemented via access keys.

15. The computer program product of claim 9, further comprising providing at least one of said first and second access zones with a zone gateway, wherein said external clients are only permitted to access those of said virtual machine instances in said at least one of said first and second access zones having said zone gateway via said zone gateway.

16. The computer program product of claim 15, further comprising grouping at least some of said external clients into a set and providing said set with a client-side gateway, wherein said external clients in said set are only permitted to access said plurality of virtual machine instances via said client-side gateway.

17. An apparatus comprising:
 a memory; and
 at least one processor, coupled to said memory, and operative to:
  obtain input regarding access control for at least one application deployed on a plurality of virtual machine instances in a cloud computing environment;
  divide said plurality of virtual machine instances into at least first and second access zones in accordance with said input;
  register internet protocol addresses of external clients as seen from said cloud computing environment, at least some of said registered internet protocol addresses comprising public internet protocol addresses assigned to said clients via network address translation;
  carry out session traversal utility for network address translation to determine said public internet protocol addresses assigned to said clients via said network address translation;

control, based on said registered internet protocol addresses:
- access of said external clients to said plurality of virtual machine instances; and
- access of said plurality of virtual machine instances to each other; in accordance with said access zones, such that:
- those of said virtual machine instances in a same given one of said access zones have access to each other;
- said external clients are permitted a first level of access to those of said virtual machine instances in said first access zone, according to a first policy; and
- said external clients are permitted a second level of access, different than said first level of access, to those of said virtual machine instances in said second access zone, according to a second policy.

18. The apparatus of claim 17, wherein said at least one processor is further operative to provide at least one of said first and second access zones with a zone gateway, wherein said external clients are only permitted to access those of said virtual machine instances in said at least one of said first and second access zones having said zone gateway via said zone gateway.

19. The apparatus of claim 18, wherein said at least one processor is further operative to group at least some of said external clients into a set and provide said set with a client-side gateway, wherein said external clients in said set are only permitted to access said plurality of virtual machine instances via said client-side gateway.

20. The apparatus of claim 17, further comprising a plurality of distinct software modules, each of the distinct software modules being embodied on a computer-readable storage medium, and wherein the distinct software modules comprise a cloud access manager module and a cloud access manager registrar module;

wherein:
- said at least one processor is operative to obtain, divide, and control by executing said cloud access manager module; and
- said at least one processor is operative to register by executing said cloud access manager registrar module.

* * * * *